United States Patent
Wimmer

(10) Patent No.: US 7,882,220 B2
(45) Date of Patent: Feb. 1, 2011

(54) SUBSTATION AUTOMATION SYSTEM WITH INCREASED AVAILABILITY

(75) Inventor: Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 12/078,347

(22) Filed: Mar. 28, 2008

(65) Prior Publication Data

US 2008/0244044 A1 Oct. 2, 2008

(30) Foreign Application Priority Data

Mar. 30, 2007 (EP) .................................. 07105380

(51) Int. Cl.
*G06F 15/173* (2006.01)
(52) U.S. Cl. ..................................... 709/224; 709/223
(58) Field of Classification Search .................. 709/208, 709/220–221, 223–224
See application file for complete search history.

(56) References Cited

U.S. PATENT DOCUMENTS

| | | | |
|---|---|---|---|
| 5,448,766 A | | 9/1995 | Sanning et al. |
| 6,275,953 B1 * | | 8/2001 | Vahalia et al. ................ 714/11 |
| 6,925,385 B2 * | | 8/2005 | Ghosh et al. .................. 702/14 |
| 7,099,800 B2 * | | 8/2006 | Henriksen et al. ........... 702/187 |
| 7,124,397 B1 * | | 10/2006 | Mathur et al. ............... 717/101 |
| 7,304,581 B2 * | | 12/2007 | Miyazaki et al. ......... 340/573.1 |
| 7,527,660 B2 * | | 5/2009 | Noujima et al. ............ 48/197 R |
| 7,558,703 B2 * | | 7/2009 | Stoupis et al. .............. 702/183 |
| 2002/0120723 A1 | | 8/2002 | Forth et al. |
| 2004/0107025 A1 | | 6/2004 | Ransom et al. |

FOREIGN PATENT DOCUMENTS

EP 1 758 301 A1 2/2007

OTHER PUBLICATIONS

Kezunovi M et al.: "Automated Monitoring and Control Using New Data Integration Paradigm" Proceedings of the 38th Hawai International Conference on System Sciences—2005, Jan. 3, 2005 pp. 1-10 XP010762451.

* cited by examiner

*Primary Examiner*—Hussein A Elchanti
(74) *Attorney, Agent, or Firm*—Buchanan Ingersoll & Rooney PC

(57) ABSTRACT

In automation systems, such as Substation Automation systems, the mean time to repair is reduced by remote reconfiguration and start-up of a replacement or spare Intelligent Electronic Device (IED), leaving some more hours for the maintenance personnel to repair an inactive or faulty IED. The time for the actual repair is irrelevant for the system availability as long as it is short enough compared to the IED failure rate. Exemplary embodiments can provide nearly the same availability as a hot-standby configuration, but without the need for doubling all the essential IEDs. Additionally, spare IEDs are supervised to be healthy, and a fault of the spare IED being detected before it is put in use. Only one spare online IED is needed for each set of IEDs of the same type connected to the same station bus and process bus. In a retrofit or extension case with limited downtime, a number of previous IEDs can be replaced by an equivalent set of new or real IEDs of a different type, but configured to perform the same functions as the previous IEDs.

10 Claims, 1 Drawing Sheet

SUBSTATION AUTOMATION SYSTEM WITH INCREASED AVAILABILITY

RELATED APPLICATION

This application claims priority under 35 U.S.C. §119 to European Patent Application No. 07105380 5 filed in Europe on Mar. 30, 2007, the entire content of which is hereby incorporated by reference in its entirety.

TECHNICAL FIELD

The disclosure relates to the field of Substation Automation systems with a standardized configuration representation and an increased availability.

BACKGROUND INFORMATION

Substations in high and medium-voltage power networks include primary devices such as electrical cables, lines, bus bars, switches, power transformers and instrument transformers, which are generally arranged in switch yards and/or bays. These primary devices are operated in an automated way via a Substation Automation (SA) system. The SA system comprises microprocessor based, programmable secondary devices, so-called Intelligent Electronic Devices (IED) responsible for protection, control and monitoring of the primary devices. The IEDs are generally assigned to one of three hierarchical levels, i.e. the station level, the bay level, and the process level being separated from the bay level by a process interface. The station level of the SA system includes an Operator Work Station (OWS) with a Human-Machine Interface (HMI). Further, the SA system includes a gateway to a Network Control Centre (NCC). The NCC hosts a central Energy Management System (EMS) and/or a Supervisory Control And Data Acquisition (SCADA) system for managing power generation and load flow to consumers. IEDs on the bay level, also termed bay units, in turn are connected to each other and to the IEDs on the station level via an optical inter-bay or station bus.

IEDs on the process-level comprise e.g. non-conventional or electronic sensors for voltage, current and gas density measurements, contact probes for sensing switch and transformer tap changer positions, or intelligent actuators for controlling switchgear like circuit breakers or disconnectors. Breaker-IEDs, if shielded against electromagnetic disturbances, may even be directly integrated into the switchgear or respective intelligent primary equipment. Such process-level IEDs are connected to the bay units via a process bus, preferably optical, which can be considered as the process interface replacing the hard-wired process-interface that conventionally connects the switchyard to the bay level equipment.

SA systems today involve interoperability between all substation devices. As such, the substation IEDs from different manufacturers should be interoperable with each other. To achieve this, an internationally accepted communication standard for communication between the secondary devices of a substation has been introduced by the International Electrotechnical Committee (IEC), as part of the standard IEC 61850 entitled "communication networks and systems in substations".

IEC 61850 defines an abstract object model for compliant substations and a method for accessing these objects over a network. This allows the substation-specific applications such as the OWS, to operate with standard objects, while the actual objects in the substation may be realized differently by the IEDs of different manufacturers. The abstract object model according to the above standard represents the SA functionality in terms of the logical nodes within the logical devices that are allocated to the IEDs as the physical devices. The actual communication between the IEDs is handled, for non-time critical messages, via IEC 61850 protocols with a Manufacturing Message Specification (MMS) communication stack built on Open Systems Interconnection (OSI), Transmission Control Protocol (TCP), Internet Protocol (IP), and Ethernet.

One consequence of the aforementioned interoperability is that the IEDs from different suppliers may be combined into one SA system. Since the IEDs are initially configured during an engineering phase, the corresponding dedicated engineering or SA configuration tools of different suppliers need to be able to exchange information about the IEDs. To this effect, the complete SA system, with all its primary devices, IEDs and communication links must be specified in a computer-readable way. This is enabled by the comprehensive XML-based Substation Configuration description Language (SCL) that is part of the IEC 61850 standard. In short, the IEC 61850 SCL language provides for a standardized description of the primary devices, the secondary devices with their protecting, controlling and monitoring (PCM) functions, the logical structure of the communication system, and the relation between the IEDs and the primary devices.

The SCL language is used to describe the capabilities of a particular IED or IED type in an IED Capability Description (ICD) file. The IED Capability Description (ICD) file lists the application functions of a physical device, for example, its implemented protection functionality. A Substation Configuration Description (SCD) file in the SCL language describes the primary objects, the functions implemented in each IED in terms of logical nodes, and the communication connections of a particular substation. Therefore, the SCD file comprises (1) a switch yard naming and topology description, (2) an IED configuration description, (3) the relationships between switch yard elements and IED functions, and (4) a description of a communication network.

High availability of a SA or any other control system, or of its critical components, is achieved by one of the following known procedures:

Hot-hot or hot-standby computers: For each IED associated with a high availability a second computer is online in the system. In a hot-hot system both IEDs are running in parallel, for a hot-standby system the standby IED is taken into active use when the hot IED fails, which in turn is supervised by the standby IED. This concept means to double each (critical) IED.

Multiple, identical CPUs within a computer: The IED's operating system (OS) distributes the application tasks to several CPUs. If one of them fails, the OS redistributes the tasks running on it to the other CPUs. All CPUs are transparently managed by this common operating system, all tasks must be able to run on this operating system and this type of CPU. Normally peripheral interfaces e.g. to program memory or to the communication system are common for all CPUs, which means that either they may fail without redundancy, or must also be handled in a hot-hot respective hot-standby mode by the OS.

Central supervision with manual repair: A central supervisory means continuously checks if an IED is working correctly, has some fault, or has failed completely. In the latter cases maintenance personnel is alarmed to replace the defect part. The mean time to repair is in the order of 6 to 24 h, which considerably reduces the availability of the system.

The patent U.S. Pat. No. 5,448,766 is concerned with a radio communication system including a terminal/controller for generating useful data and a normally operating transmitter for transmitting the useful data and generating status information. In a hot-hot configuration, a redundant transmitter is coupled to the terminal controller and the normally operating transmitter and transmits the useful data latter in case the status information indicates abnormal operation of the normally operating transmitter.

SUMMARY

Exemplary embodiments disclosed herein can increase the availability of a Substation Automation (SA) system.

A method of increasing the availability of an automation system is disclosed with a standardized configuration description and comprising a first Intelligent Electronic Device (IED) of a first IED type, the first IED performing protection, control and/or monitoring functions and being connected to a station bus and a process bus of the automation system, the method comprising: connecting a first replacement IED to the station bus and the process bus; detecting an inactivity of the first IED; configuring the first replacement IED with a functionality and identity of the first IED; and substituting the configured first replacement IED for the first IED.

A central IED manager for an automation system is disclosed with a standardized configuration description and comprising a first Intelligent Electronic Device (IED) of a first IED type, the first IED performing protection, control and/or monitoring functions, as well as a first replacement IED, wherein the first IED and the first replacement IED are connected to a station bus and a process bus of the automation system, the central IED manager comprising: means for detecting an inactivity of the first IED; means for configuring the first replacement IED with a functionality and identity of the first IED.

A computer readable medium containing a computer program for execution by a computer is disclosed for increasing the availability of an automation system with a standardized configuration description and comprising a first Intelligent Electronic Device (IED) of a first IED type, the first IED performing protection, control and/or monitoring functions, as well as a first replacement IED, wherein the first IED and the first replacement IED are connected to a station bus and a process bus of the automation system. The computer program performs the steps of: detecting an inactivity of the first IED; configuring the first replacement IED with a functionality and identity of the first IED; and substituting the configured first replacement IED for the first IED.

BRIEF DESCRIPTION OF THE DRAWINGS

The subject matter of the disclosure will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
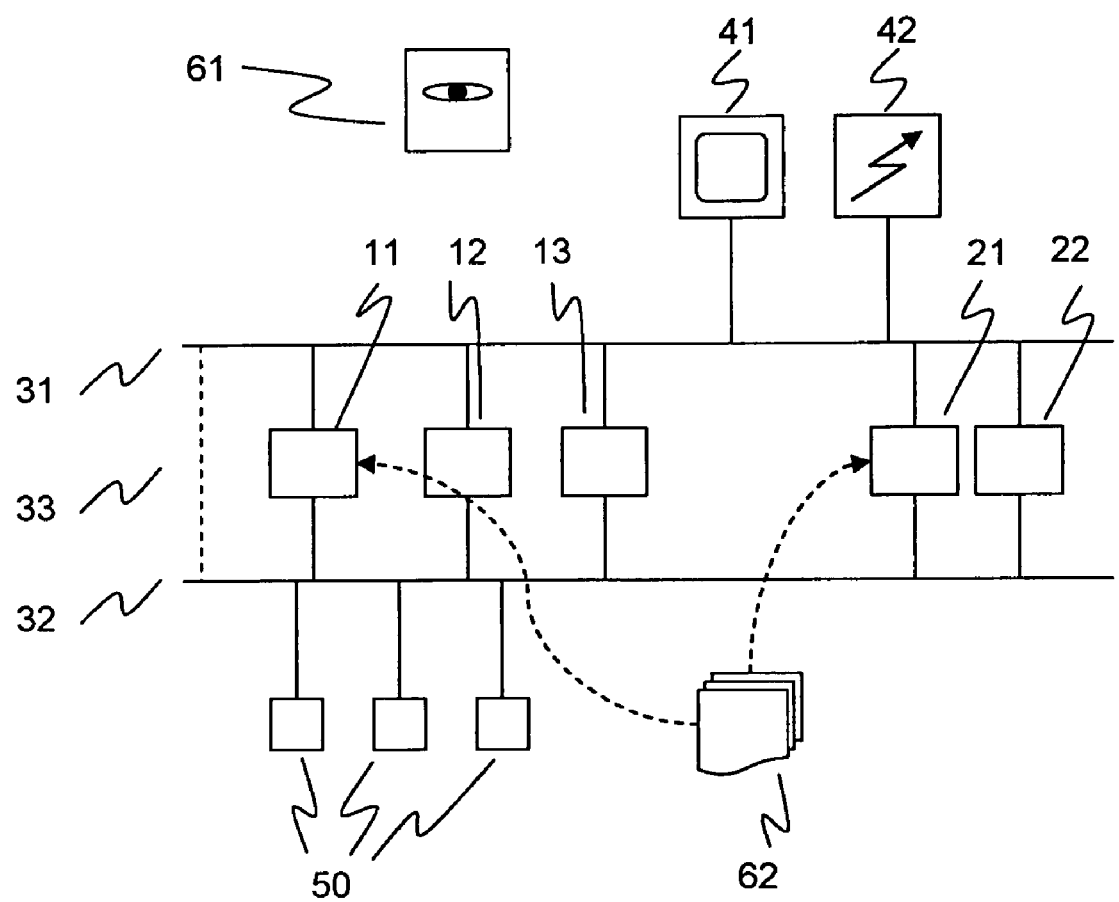
FIG. 1 schematically shows an excerpt of an exemplary Substation Automation system.

Exemplary embodiments are directed to a replacement or spare IED which can be automatically configured with the functionality and identity of an inactive or failed IED and substituted for the inactive or failed IED, without any physical replacement or removal of the latter taking place in a first step. Inactivity or failure of an entire IED or of a part thereof can be readily detected by supervising the health of the IED as provided for by IEC 61850. The process interfaces of the IEDs are freely configurable by loading some configuration data, excluding e.g. any hard-wiring to the inactive or failed IED. This aspect can be complied with by process connections, as well as higher level connections, running via configurable communication interfaces like IEC61850 process bus or station bus.

In a first use case, the replacement or spare IED is connected to the station and process bus at an early stage and made available online in order to prepare for a future failure of the first IED. This can enhance the availability of an automation system, such as a Substation Automation (SA) system to a level close to the availability of a hot-standby configuration, but without one having to double all IEDs. A second use case is concerned with retrofit situations, where a 'new' IED is connected to the SA system and substituted for an 'old' IED. The new or replacement IED in this case is generally of a different type, but providing at least the same functionality as the old or inactive IED. Fast switching to the new IED is triggered by simply switching off the old one, i.e. by provoking a deliberate inactivity or failure. Here, availability of the SA system can be increased by reducing retrofit-downtime of the SA system, as compared to physically removing the old IED followed by connection and manual starting-up of the new IED. Similarly, in case there is an error present on the new IED, turning it off implies a fast switching back to the old IED. A third use case is a system extension, where an 'active' IED can be provided for simulating a non-existing part of the SA system. At extension time, the previously non-existing part is made operational, and the 'real' IED of the extension substitute for the active simulation IED within minutes just by turning off the simulation IED or at least by inactivating its simulation part. Extension-downtime related to this process is limited, and availability of the extending SA system correspondingly increased.

In an exemplary embodiment of the disclosure, the replacement or spare IED has the same type as the inactive or failed IED. In the context of the present disclosure, two IEDs are of the same IED type if they both produce, when being configured with identical configuration data and fed with identical input data, the same output. The configuration data can be a Substation Configuration Description (SCD) or a Configured IED Description (CID) file as encoded in a Standardized Configuration description Language (SCL) based on an XML schema according to the IEC 61850 standard. Alternative configuration data are parameter and configuration values loaded with standardized communication services e.g. according to IEC61850, or even additional function logic and programs loaded into the IED by standardized communication services, e.g. IEC61850 file services or FTP. For this variant, the engineering effort can be considerably reduced as compared to the previous use cases with pre-configurations for a multitude of IED instances of any type that a single spare IED shall be able to replace, or with configuration data for new IEDs being different from the configuration data of the old IEDs in the retrofit case.

An exemplary SA system can have IEDs of various types and several IEDs of the same type, of which the identity in the system is defined by remotely settable configuration data only, as is the case in Substation Automation systems with several protection and control IEDs of the same IED type in different bays. In this case, for each of the sets of IEDs with identical type connected to the same or equivalent process interface e.g. by IEC61850 process bus, and same station level IEDs e.g. by IEC61850 station bus, there can be one spare IED.

In a further exemplary embodiment, any spare IED is known as spare and is configured as spare, i.e. just allowing IED supervision and configuration. Supervision of the spare IEDs and prompt repair by an operator helps to prevent that they are defect in case that they are actually needed—they fail in general with the same probability as any active IED.

In an exemplary embodiment of the disclosure, some central IED manager supervises or monitors all IEDs. In case that the central IED manager detects an inactivity or failure of some IED, it checks if a suitable replacement IED is available. If yes, it stops the failed IED (if possible and necessary), and reloads corresponding configuration data onto the replacement IED, which then resumes the identity and tasks of the failed IED. Maintenance personnel may later repair or physically replace the failed IED, which then becomes a new replacement IED. If multiple IED types are supervised and/or provided as replacement IEDs, the central IED manager has to be aware of the functionally equivalent sets of replacement IEDs and of the configuration data corresponding to any inactive or failed IED. In the first use case above, the supervisory activity can inform the maintenance personnel about any observed fault of an IED.

In summary, the mean time to repair can be reduced from several hours down to a few minutes needed for remote reconfiguration and start up of the spare IED, leaving some more hours for the maintenance personnel to repair the faulty IED. The time for the actual repair is irrelevant for the system availability as long as it is short enough compared to the IED failure rate. Therefore the present disclosure leads to nearly the same availability as a hot-standby configuration, but without the need for a special coordination or cooperation for a hot-hot or hot-standby concept. Additionally, spare IEDs are supervised to be healthy, and a fault of the spare IED being detected before it is put in use. And finally, only one spare online IED is needed for each set of IEDs of the same type connected to the same station bus and process bus. In a retrofit or extension case with limited downtime, a number of previous IEDs are replaced by an equivalent set of new or real IEDs of a different type, but configured to perform the same functions as the previous IEDs.

Although the present application focuses on Substation Automation, it is evident that the principles and methods are likewise applicable to other automation systems (including control systems) with a standardized configuration description, such as wind power, hydro power and Distributed Energy Resources (DER). Likewise, it is evident that the code of a computer program for carrying out all or some of the steps according to the disclosure may be stored in a computer program product, e.g. in a computer readable medium, either in the memory of a computer or other device for performing the steps, or on a data carrier that can be inserted into the computer or device.

FIG. 1 shows an excerpt of an exemplary Substation Automation (SA) system with a first IED 11, a second IED 12, and a third IED 13, all of them configured for protection, control and monitoring of substation primary devices (not shown). The IEDs 11, 12, 13 are each connected to a station bus 31 as well as a process bus 32. Further connected to the station bus 31 are Operator Work Station 41 and NCC gateway 42. The process bus 32 represents a process or communication interface to a number of physical I/Os or process-level IEDs 50. Station bus 31 and process bus 32 may be physically identical, i.e. parts of the same bus segment as indicated by the connecting cable 33, or at least connected by a router which allows also access to the process-level IEDs 50 by an IED manager as below.

Likewise connected to the station bus 31 and process bus 32 are spare IEDs 21, 22. A central IED manager 61 monitors the health or any equivalent status of the IEDs 11, 12, 13. In case of failure, a spare IED 21, 22 is configured to perform the same functions as the failed IED. The spare IED 21 can be of the same type as the failed IED 11 and can be configured with standardized configuration data from configuration file 62.

The central IED manager 61 manages a multitude of different IED types or sets with distinct IED manufacturer, operating system and basic firmware. An exemplary prerequisite is that the IEDs can be reconfigured by using standardized configuration data and standardized services, as offered by IEC 61850, and that they are connected purely via communication interfaces to process level and higher levels.

The central IED manager 61 may work in a hot-hot or hot-standby configuration, however at least its failing should be supervised. It can be integrated onto some station level IED, e.g. OWS 41, but also run as part of some separate system supervision IED. Central IED manager 61 may even operate as remote supervisory device for several SA systems in parallel, provided that a sufficiently fast remote connection exists to limit reconfiguration times. For IEC 61850 systems, central IED manager 61 can be configured automatically from the system SCD file, with the additional indication of the location and set of IED configuration files per IED type.

After repair of the failed IED, this can be taken into active use again, making the original spare IED a spare again. This might make sense, if due to the physical structure of the communication system and the physical placement of the spare IED this has some performance penalties against the original IED. It could be reached relatively simple, by just switching off the original spare IED, and, after reconfiguration to the original IED, switching it on again as spare (reconfiguring the spare identity to it).

Having two or more spare IEDs per set online instead of just one can enhance the availability even further, respectively reduces the urgency to repair a failed IED. If due to long travelling times the human repair time is in the order of days or weeks, probability theory and known failure rate of IED types can calculate an optimal number of online spare IEDs of each type. The same holds if no other spares are on stock and instead have to be ordered by the original manufacturer in order to bridge a known delivery time.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS 11, 12 PCM IED
21, 22 spare IED
31 station bus
32 process bus
33 bus connection
41 HMI
42 gateway
50 process device
61 IED manager
62 configuration file

What is claimed is:

1. A method of increasing the availability of an automation system with a standardized configuration description, wherein the system includes and comprising a first Intelligent Electronic Device (IED) of a first IED type, an IED manager, process-level IEDs, and at least one replacement IED, wherein the IED manager is connected to communicate with the first IED and the at least one replacement IED over the station bus, and wherein the first IED and the at least one replacement IED are connected to communicate with the process-level IEDs over the process bus, the method comprising:

connecting the at least one replacement IED to the station bus and the process bus for communicating with the IED manager and the process-level IEDs, respectively;

detecting, at the IED manager, an inactivity of the first IED over the station bus;

sending, from the IED manager, configuration data to the at least one replacement IED over the station bus, wherein the configuration data configures the first replacement IED with a functionality and identity of the first IED; and substituting, at the IED manager, the configured first replacement IED for the first IED in the automation system.

2. The method according to claim 1, wherein first standardized configuration data of the first IED is stored in a configuration file and wherein the at least one replacement IED is a first spare IED of the first IED type, the method comprising:

configuring the first spare IED with said first standardized configuration data.

3. The method according to claim 2, wherein the SA system comprises a second IED of a second IED type and performing protection, control and/or monitoring functions, with second standardized configuration data of the second IED being stored in a configuration file, as well as a second spare IED of the second IED type, the method comprising:

detecting, at the IED manager, a failure of the second IED over the station bus;

sending, from the IED manager, configuration data to the second spare IED over the station bus, wherein the configuration data configures the second spare IED with said second standardized configuration data; and substituting, at the IED manager, the configured second spare IED for the failed second IED in the standardized configuration description.

4. The method according to claim 2, comprising:
supervising the spare IED over the station bus;
detecting a failure of the spare IED over the station bus; and
notifying an operator of the failure in the spare IED.

5. Method according to claim 1, comprising performing, by the first replacement IED, protection, control and/or monitoring functions on behalf of a substation in a high or medium voltage power network.

6. Method according to claim 1, comprising performing, by the first replacement IED, protection, control and/or monitoring functions on behalf of a system generating electric power from wind power or hydro power.

7. A non-transitory computer readable medium containing a computer program for execution by a computer for increasing the availability of an automation system with a standardized configuration description, wherein the system includes a first Intelligent Electronic Device (IED) of a first IED type, an IED manager, process-level IEDs, and a first replacement IED wherein the central IED manager is connected to communicate with the first IED and the at least one replacement IED over the station bus and is connected to communicate with the process-level IEDs over a process bus, and wherein the first IED and the at least one replacement IED are connected to communicate with the process-level IEDs over the process bus, wherein the at least one replacement IED is connected to the station bus and the process bus for communicating with the IED manager and the process-level IEDs, respectively; wherein the computer program causes a computer if the IED manager to execute the steps of:

detecting an inactivity of the first IED over the station bus;
configuring the first replacement IED with a functionality and identity of the first IED over the station bus; and
substituting the configured first replacement IED for the first IED in the automation system.

8. The computer readable medium according to claim 7, wherein first standardized configuration data of the first IED is stored in a configuration file and wherein the first replacement IED is a first spare IED of the first IED type, and wherein the computer program performs the steps of:

configuring the first spare IED with said first standardized configuration data over the station bus.

9. The computer readable medium according to claim 7, wherein the system comprises a second IED of a second IED type and performing protection, control and/or monitoring functions, with second standardized configuration data of the second IED being stored in a configuration file, as well as a second spare IED of the second IED type, the computer program performing the steps of:

detecting a failure of the second IED over the station bus;
sending configuration data to the second spare IED over the station bus, wherein the configuration data configures the second spare IED with said second standardized configuration data; and
substituting the configured second spare IED for the failed second IED in the standardized configuration description.

10. The computer readable medium according to claim 7, wherein the computer program performs the steps of:
supervising the spare IED over the station bus;
detecting a failure of the spare IED over the station bus; and
notifying an operator of the failure of the spare IED.

* * * * *